(12) United States Patent
Alabraba et al.

(10) Patent No.: US 7,346,585 B1
(45) Date of Patent: Mar. 18, 2008

(54) COMPUTER SOFTWARE AND SERVICES LICENSE PROCESSING METHOD AND SYSTEM

(75) Inventors: Ferdinand Jay Alabraba, Seattle, WA (US); Aidan T. Hughes, Bellevue, WA (US); Matthew William Pearson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 10/376,742

(22) Filed: Feb. 28, 2003

(51) Int. Cl.
*G06Q 99/00* (2006.01)
(52) U.S. Cl. ............... 705/59; 705/52; 705/51; 705/57; 705/58; 380/200; 380/201; 380/202; 380/203; 726/26; 726/27; 726/30; 726/31; 726/33
(58) Field of Classification Search ............ 705/50–79; 726/26–33; 380/200–203
See application file for complete search history.

(56) References Cited

U.S. PATENT DOCUMENTS

| | | | |
|---|---|---|---|
| 6,006,190 A | 12/1999 | Baena-Arnaiz et al. | 705/1 |
| 6,169,976 B1 * | 1/2001 | Colosso | 705/59 |
| 6,189,146 B1 | 2/2001 | Misra et al. | 717/11 |
| 6,453,344 B1 | 9/2002 | Ellsworth et al. | 709/220 |
| 6,690,400 B1 * | 2/2004 | Moayyad et al. | 715/779 |
| 7,065,504 B2 * | 6/2006 | Sakuma et al. | 705/52 |
| 7,080,042 B2 * | 7/2006 | Koike et al. | 705/52 |
| 2002/0114466 A1 * | 8/2002 | Tanaka et al. | 380/232 |
| 2002/0184144 A1 * | 12/2002 | Byrd et al. | 705/40 |
| 2003/0191936 A1 * | 10/2003 | Kawatsura et al. | 713/156 |
| 2004/0024688 A1 | 2/2004 | Bi et al. | |
| 2004/0039916 A1 * | 2/2004 | Aldis et al. | 713/177 |

OTHER PUBLICATIONS

Weber, Robert, "Digital Rights Managemnet Technologies", Oct. 1995.*

* cited by examiner

*Primary Examiner*—Jalatee Worjloh
(74) *Attorney, Agent, or Firm*—Merchant & Gould

(57) ABSTRACT

Integrated computer services and software licensing processing methods and systems are provided. A license processing service (LPS) receives a services or software license request from a user via a client computer. The LPS communicates the request to a billing system for the services or software provider to obtain an expiration date for use of a desired service or software product. The LPS receives and forwards the expiration date from the billing system to a licensing clearinghouse operated by the provider of the desired service or software product. The clearinghouse, in turn, provides a use license for the desired service or software application to the client computer via the LPS.

30 Claims, 4 Drawing Sheets

COMPUTER SOFTWARE AND SERVICES LICENSE PROCESSING METHOD AND SYSTEM

FIELD OF THE INVENTION

This invention relates to computer software and services license processing methods and systems.

BACKGROUND OF THE INVENTION

Computer software applications allow users to create a variety of documents to assist them in work, education and leisure. For example, a word processing application allows users to create letters, articles, books, memoranda and the like. Spreadsheet applications allow users to store, manipulate, print and display a variety of a alphanumeric data. Internet-based web services applications allow users to access a variety of software applications and data over distributed computing environments. Such applications have a number of well-known strengths including rich editing, formatting, printing, calculation, data search and retrieval, and the like.

Prior to the advent of distributed computing environments including the Internet and intranets, a typical computer software or services user purchased or otherwise obtained a software application and loaded that application onto the user's computer for stand-alone use. When subsequent changes, revisions, patches, or improvements to the software application were developed, users typically were required to purchase the updated software application and load the application onto the user's computer. With the advent of distributed computing environments, a variety of distributed services such as Internet-based web services are now available to allow users to search for, download, and manipulate a variety of data and software applications. Thus, as an update or change to a given software application is developed, a user is often able to purchase the updated software from a provider via the distributed computing environment and download the software to the user's computer.

An extension to the capabilities provided to users via distributed computing environments is the ability of users to obtain web services and software applications on a subscription basis rather than on a purchase basis. For example, if a user desires to obtain the Internet-based web services of a particular news source and the word processing capabilities of a particular word processing software application, the user may be able to subscribe to the providers of each of those services/applications to have those services and/or applications provided to the user for a certain duration of time. Unfortunately, the process by which a user subscribes to various providers for services and software applications is cumbersome and time consuming where the user must contact each services and/or application provider, make payment to a billing system of the provider, and then obtain a license for use of the service or application from a separate licensing clearinghouse operated by the provider. If the user desires to update her license for a given service or application, the user is often required to contact a billing system of the provider to obtain additional use of the service or application in order to update the user's license.

It is with respect to these and other considerations that the present invention has been made.

SUMMARY OF THE INVENTION

Embodiments of the present invention provide methods and systems for integrating licensing processing to improve and streamline a user's ability to obtain computer services and applications via a distributed computing environment for use on a subscription basis. Generally described, a license processing service (LPS) receives a services or software license request from a user via a client computer. The services request may include a request for use of one or more client applications and/or web-based services. The LPS communicates the request to a billing system for the services or software provider to obtain an expiration date for use of a desired service or software application. The LPS receives and forwards the expiration date from the billing system to a licensing clearinghouse operated by the provider of the desired service or software. The clearinghouse, in turn, provides a use license for the desired service or software application to the client computer via the LPS.

More particularly described, according to an aspect of the present invention, the LPS includes a client services sector, a billing system sector, and a clearinghouse sector integrated via a core communication component. License requests received by the LPS from a client computer are received at the client services sector and are communicated to the core. When the request is received at the client services sector, an authentication of the client is performed to ensure that the client computer is communicating with the LPS from a trusted communication source from which the LPS will receive communications. In addition to the licensing requests, a hardware identification for the client computer, a product identification for the desired service or software, and an authentication identification are forwarded to the core for transmission to the billing system.

The billing system parses the user's authentication and product identification information and determines a subscription expiration date for the service or software application desired by the user. The billing system transmits the expiration date to the billing sector of the LPS. The billing sector returns the expiration date to the core that schedules and executes a communication via the clearinghouse sector for ultimate communication to a license clearinghouse operated by the provider of the desired service or software application. The clearinghouse sector of the LPS forwards the expiration date, authentication identification, hardware identification, and product identification to the license clearinghouse of the provider. The provider prepares and forwards a use license for the desired service or application back to the LPS clearinghouse sector. The core then forwards the license via the client services sector to the client computer so that the client computer may commence use of the desired service or application.

These and other features, advantages and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

The following description of embodiments of the present invention is made with reference to the above-described drawings wherein like numerals refer to like parts or components through the several figures. The present invention is directed to integrated computer services and software licensing processing methods and systems.

Operating Environment

Figure 1:
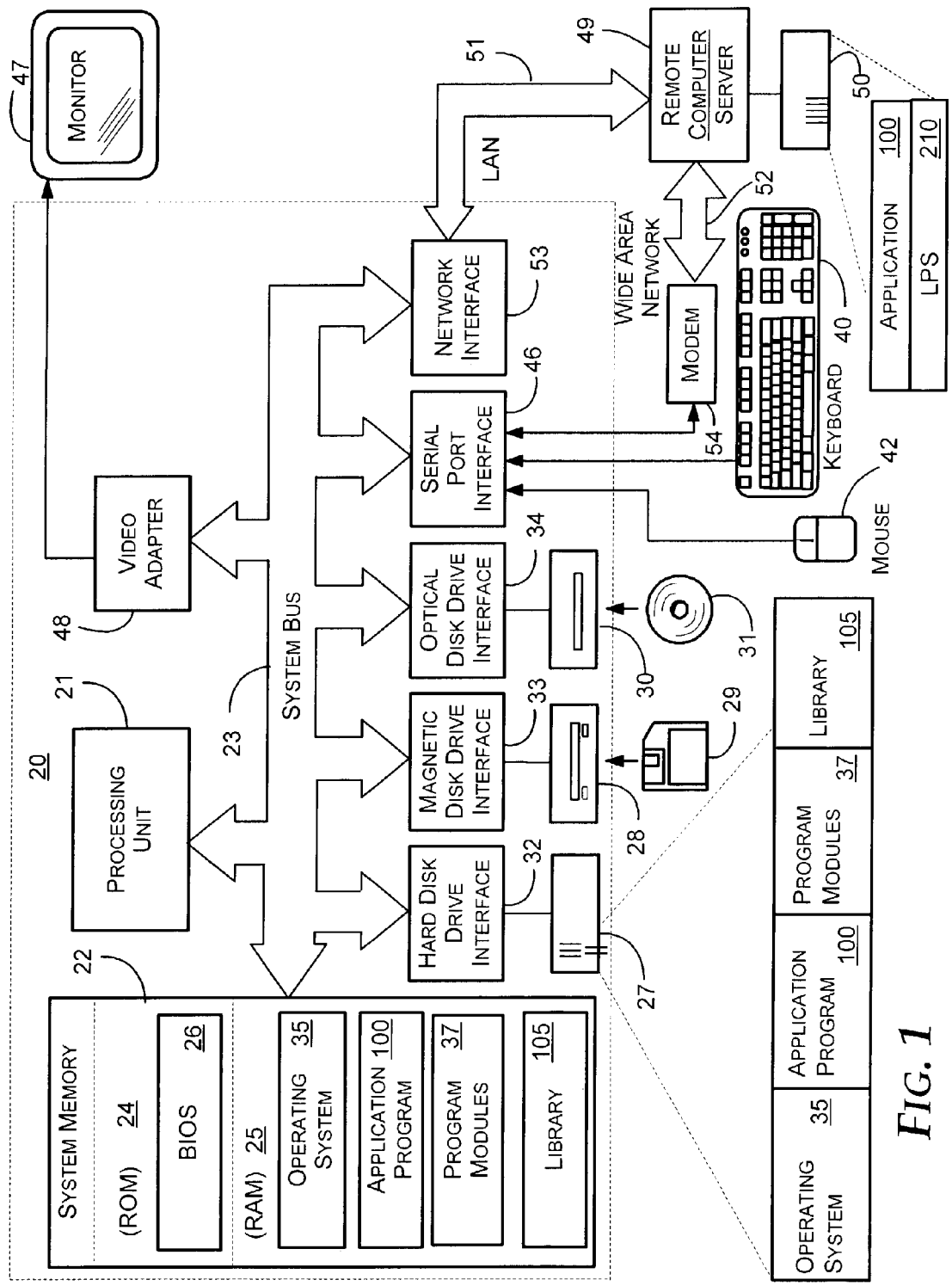
FIG. 1 is a block diagram of a computer and associated peripheral and networked devices that provide an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program data, such as the license processing service program module 210, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
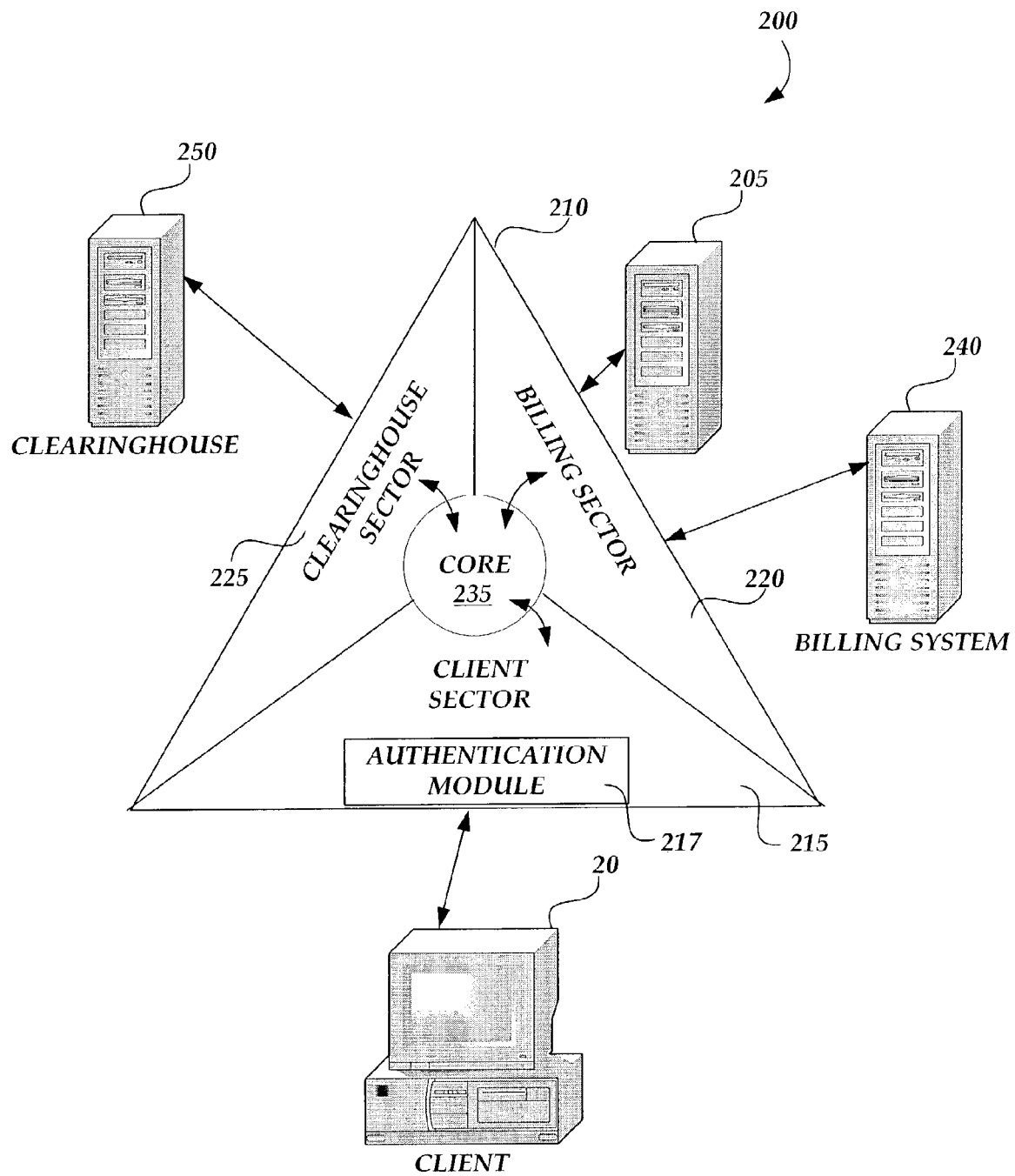
FIG. 2 is a simplified block diagram illustrating interaction between a client computer, a billing system and a licensing clearinghouse with an integrated license processing service.

Referring to FIG. 2, according to embodiments of the present invention, a license processing service system 200 is composed of several autonomous services integrated to form a license architecture for obtaining subscription based offerings of desired software applications and/or services. The system is adaptable for use in any situation where a client requires a securely created authorization license for use of a desired software application and/or services, and where the acquisition process for the license requires communication between two or more autonomous server-side authorities such as a billing system and a license clearinghouse of the provider of a desired service or software. According to the present invention, license processing may be performed for obtaining services or products licenses for use at the client computer 20 via an on-line communication from the client to external service provider systems through the LPS 210. The user may operate the client computer 20 in an offline environment utilizing licensed software application products. When an update to a particular license is required to continue the use of a licensed product beyond a license expiration date, the user may go online to communicate with the product provider in an online environment via the LPS 210.

The license processing service (LPS) 210, illustrated in FIG. 2, includes a core component (core) 235 and three sectors 215, 220, 225 that serve as interfaces for interaction between the LPS and external parties, such as the billing system 240 and the clearinghouse 250 of providers of services and software applications. According to an embodiment of the present invention, the LPS 210 is a server-side component that operates separately from the client computer 20 via a distributed computing environment where the LPS 210 is separated from the client 20 via a firewall for providing security for interaction between the client 20 and the LPS 210. The functionality of the LPS 210 may be provided by a software module maintained on a server 205, similar to the server 49 illustrated in FIG. 1, or other suitable computing device for communicating license requests and associated data between the client 20 and external licensing party facilities such as the billing system 240 and the clearinghouse 250.

According to an alternative embodiment, the LPS 210 may be a software module installed on a client computer 20 on the client side of a distributed computing environment and all communication with external services and/or software product provider systems, such as the billing system 240 and the clearinghouse 250, may be communicated from the client 20 via the LPS 210 from the client side to systems 240 and 250 via a distributed computing environment such as the Internet. According to this alternative embodiment, data communicated between the external services and/or product provider systems may be cryptographically secured, for example, by use of digital signatures, to prevent client tampering.

The billing system 240 is representative of a billing system of any provider of services or products such as software applications to which payment for desired services or products is made and from which a timed duration for use of a subscription-based service or product is received. The clearinghouse 250 is representative of one or more licensing servers operated by providers of computer services or software applications such as Internet-based web services. As should be appreciated by those skilled in the art, the licensing clearinghouse 250 may be operated by any services or software applications providers for processing licensing requests and for forwarding licenses to clients for use of a desired service or product.

Referring to the LPS 210, a core component (core) 235 coordinates communication among the client services sector 215, the billing sector 220 and the clearinghouse sector 225. Communication between the sectors, and consequently, communication between external services systems such as the billing system 240 and the clearinghouse 250 takes place by an initiating sector, for example, the client services sector 215 receiving a request from the client 20. According to an embodiment of the present invention, the core 235 includes programming instructions which when executed by a computer parse data received from one of the associated sectors 215, 220, 225 and schedule and subsequently execute a communication of that data to one of the other sectors for ultimate transmission to an external recipient such as the client 20, the billing system 240, or the clearinghouse 250. The sectors 215, 220, and 225 are pluggable in nature and may be substituted with other sectors associated with other types of subscription services which may, in turn, communicate with the core 235 for licensing processing. For example, a product-purchasing sector may be added to the LPS 210 that may receive communications from a client 20 via the core 235 and billing system 240 to forward a purchasing request to a purchasing clearinghouse to obtain a desired product.

The sectors 215, 220, 225 are LPS interfaces that exist to support communication with external services/product provider systems, such as the billing system 240 and the clearinghouse 250. In addition to supporting data exchanged between the LPS 210 and the external services systems, the sectors includes programming instructions which when executed by a computer manipulate data received by those sectors for communication to the core 235 and for ultimate communication to a different sector or to an external services/product system 240, 250. Each sector exposes at least two interfaces including an internal interface between itself and the core 235 and an external interface between itself and an external service/product system in which it communicates, such as the client 20, billing system 240, or clearinghouse 250. As should be understood by those skilled in the art, each sector may have a plurality of external interfaces for communication with multiple different services/products systems. For example, the clearinghouse sector 225 may have a plurality of external interfaces for communicating with a plurality of different clearinghouses 250 representing a multitude of licensing clearinghouses for licensing services and/or products from different providers.

The client services sector 215 is an interface between the LPS 210 and the client 20. Transport protocols between the client 20 and the client services sector 215 via a distributed computing environment may use hypertext transfer protocol or other well known protocols including remote procedure call communication protocol. In order to authenticate communications from the client 20 before the communications are processed by the LPS 210, an authentication module 217 is provided. As is understood by those skilled in the art, authentication is a process often used in a multi-user or networked operating system whereby a user's log on information is validated by comparing the user's name and password against an authorized list where if a match of the user's name and password is found against the authorized list, access is granted to the user. According to an embodiment of the present invention, an authentication process is performed to ensure that communication from the user via the client 20 is from a trusted source such as a communication network from which the LPS 210 and the external provider systems 240 and 250 will accept communications. According to an embodiment of the present invention, a suitable authentication module 217 is PASSPORT manufactured by MICROSOFT CORPORATION of Redmond, Wash. Alternatively, the authentication module may be resident at a remote authentication service, such as a web-based authentication service accessible via the Internet, for authenticating communications from the client.

The billing sector 220 is an interface for communication of data between the LPS 210 and the billing system 240. The clearinghouse sector 225 is an interface between the LPS 210 for communication and the clearinghouse 250. As should be understood by those skilled in the art, communication between the sectors of the LPS 210 and external systems including the client 20, the billing system 240 and the clearinghouse 250 may be performed using application programming interfaces for communication calls between the sectors of the LPS 210 and external systems via a distributed computing environment such as the Internet. Further, communications between sectors of the LPS 220 and external systems 20, 240 and 250 may be secured by passing encrypted data from sectors of the LPS 210 to the external system at which the data is decrypted for use by the external system utilizing a decrypting key operated by the providers of the external systems 20, 240 and 250.

Figure 3:
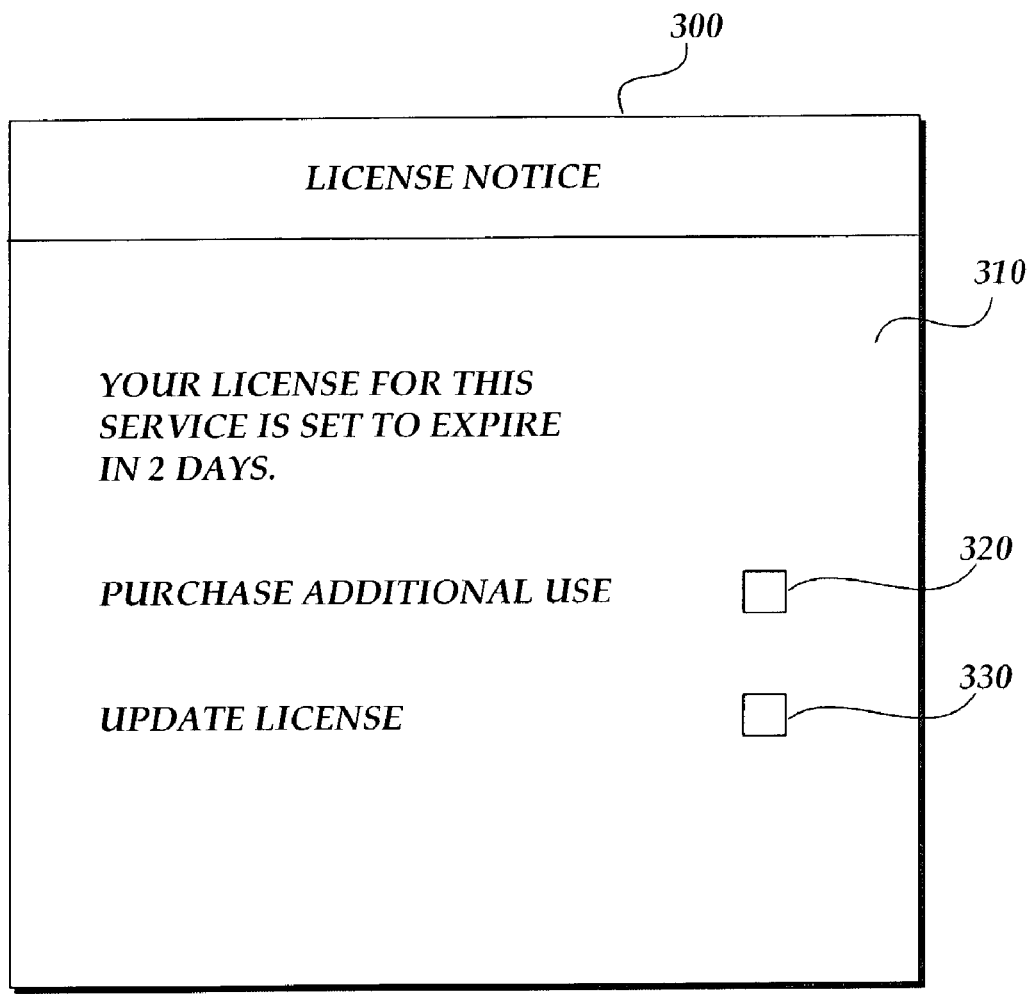
FIG. 3 illustrates a graphical user interface for notifying a user that the user's license for use of a service or software application is set to expire and for receiving input from the user.

Referring to FIG. 3, a graphical user interface 300 is illustrated for providing a license notice to a user of the client computer 20. According to an embodiment of the present invention, if the user has subscribed to a given service or software application, such as the web services of an Internet-based web service, the user may subscribe to a given duration of use such as a one year of use of the selected web services. When the user's prescribed use of the web services, for example, is nearing the expiration date, a license notice 300 graphical user interface, such as illustrated in FIG. 3, may be provided to the user to notify the user that the user may update the user's license by purchasing additional time. Accordingly, the user may select the "purchase additional use" button 320 to initiate a license request from the user's client computer 20 through the LPS 210 to obtain a new expiration date from the billing system 240 and an updated license from the clearinghouse 250 so that the user may continue use of the selected web services. Alternatively, the user may have previously contracted with the web services provider by contacting the provider via the billing system 240 to purchase additional web services time from the provider. Subsequently, when the license notice 300 is presented to the user, the user may select the "update license" button 330 to initiate a communication to the billing system 240 via the LPS 210 whereby an updated expiration date based on the previous communication from the user is forwarded to the clearinghouse 250 via the LPS 210 so that an updated license is passed to the client 20 for use by the user. As should be understood by those skilled in the art, the license notice 300 is by way of example only and is not restrictive of the invention as claimed herein.

Figure 4:
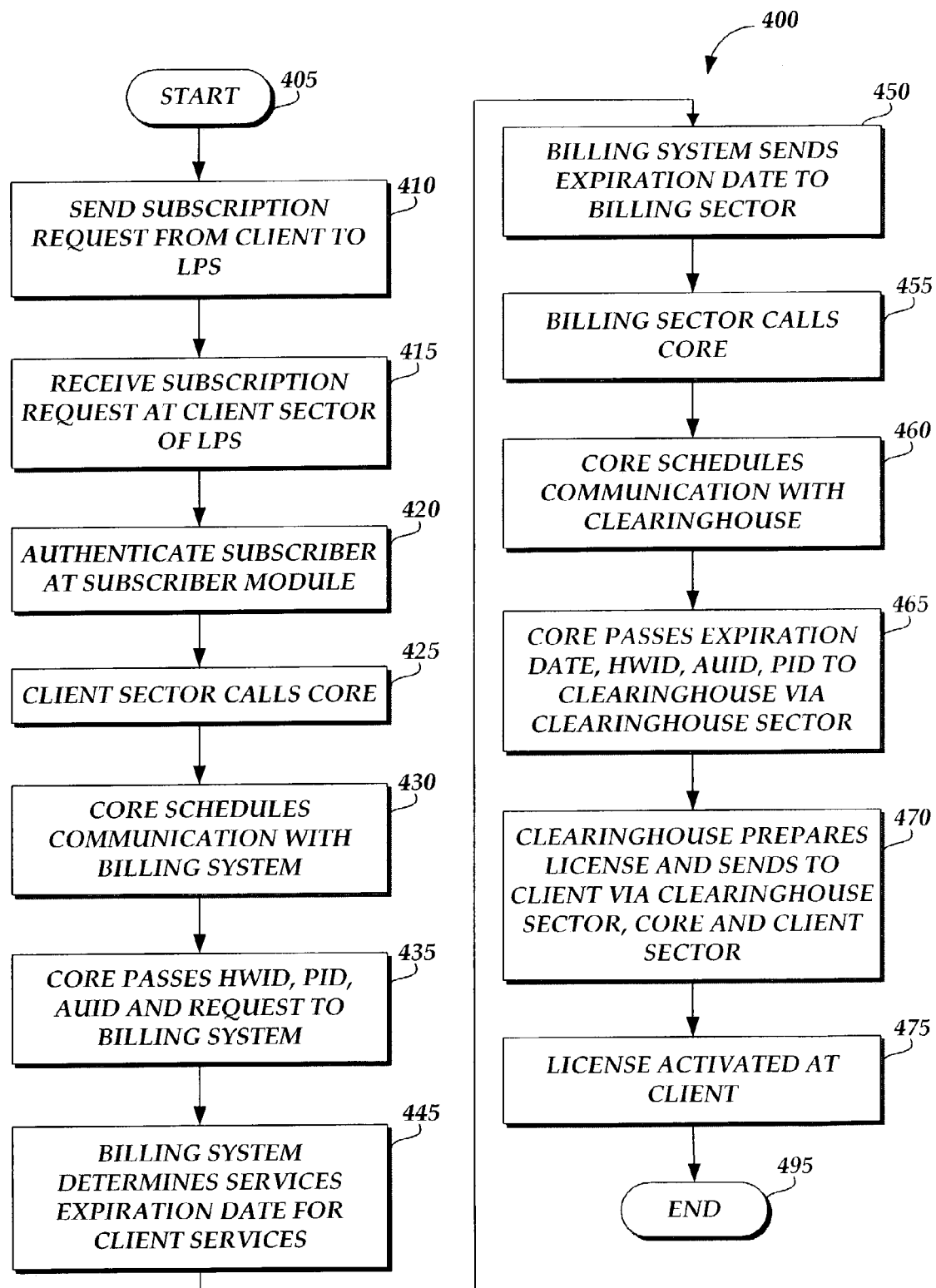
FIG. 4 is a flowchart illustrating a method for processing a license request from a client computer for obtaining or updating a license for use of a desired service or software application product.

FIG. 4 is a flowchart illustrating a method for processing a license request from a client computer for obtaining or updating a license for use of a desired service or software application product. For purposes of description of FIG. 4, assume, for example, that a user of Internet-based web services desires to subscribe to client applications or web services for use at the client computer 20. The method 400 begins at start step 405 and proceeds to step 410 where the user via the client computer 20 sends a subscription license request from the client 20 to the LPS 210. According to an embodiment of the present invention, the request for license includes a hardware identification number for the client computer 20 and a product identification number for the desired services or software product, such as the client applications and/or web services desired by the user. As should be understood by those skilled in the art, the hardware identification number may be a number provided by the user's computer 20, or the hardware identification number may be calculated by a software program module operated on the user's computer 20 and forwarded to the LPS 210 along with the subscription request.

The product identification number (PID) includes a unique identification for the desired product such as the web services product. Included with the PID is data corresponding to the services requested by the user and the duration of time allowed for use of the services according to the request made by the user. According to an embodiment of the present invention, the PID is a token comprised of a set number of characters, such as 25 characters that is encoded with data that will be used by the billing system 240 for determining the expiration date associated with the requested service. For example, if the user purchases a software application product that provides as a marketing promotion a one year subscription to a given Internet-based web service, the PID may be published on the packaging of the software application product, and the PID may be encoded with data which when parsed by the billing system 240 will allow the billing system 240 to prepare an expiration date of one year associated with the promotional use of the web services product. Alternatively, a table may be established in the billing system 240 where specific PID data is mapped to duration periods as opposed to including duration periods in the PID. Thus, owners/operators of the licensing or billing system may change (at any time) duration periods associated with PIDs already in the system.

After the hardware identification (HWID) and PID are received at the client services sector 215 at step 415, the authentication module 217 authenticates the user as coming from a trusted source from which the LPS 210 and the external services/products provider systems will receive communications at step 420. If the user is authenticated by the authentication module 217, an authentication user identification (AUID) is created for traveling with data from the client 20 thereafter for authenticating the source of the request to subsequent processors of the request such as the billing system 240 and the clearinghouse 250. As should be understood by those skilled in the art, the user may have previously received an AUID number that the user may forward to the LPS 210 along with the subscription request.

At step 425, the client services sector 215 calls the core 235 and provides the HWID, the AUID, and the PID along with the subscription request from the user. At step 430, the core 235 assembles the data from the client services sector 215 into a format for transmission to the billing system 240 of the provider of the desired web services. As should be understood by those skilled in the art, the core 235 may be programmed to parse data received from the client services sector 215 and assemble the data into a format for consumption by the billing system 240 of the provider of the desired web services. Alternatively, the core 235 may simply assemble the data, schedule and subsequently communicate the data via the billing sector 220 to the billing system 240 where the billing sector 240 assembles the data into a format for consumption by the billing system 240. As should be understood, a number of different billing systems 240 associated with different services or products providers may be associated with different billing sectors 220 that are plugged into the LPS 210 for communicating between a given billing system 240, a corresponding billing sector 220 and the core 235. That is, one services provider may have a billing sector 220 plug-in associated with its billing system 240 and another services provider may have a separate billing sector 220 for serving as a communication interface between its billing system 240 and the core 235 of the LPS 210.

At step 435, the core 235 passes the HWID, the PID, the AUID and the request from the client services sector 215 to the billing system 240 via the billing sector interface 220. At step 445, the billing system 240 receives the data from the LPS 210. The billing system 240 matches the PID against the AUID and HWID associated with the client 20 and then parses the PID in order to determine an expiration date for the desired service. For example, if the provider of the desired client application(s) and/or web services has offered a one-year promotional use of the web services associated with a software application purchased and installed by the user on the client 20, the billing system 240 will find the one-year duration associated with the PID. Accordingly, the billing system 240 prepares an expiration date of one year and, at step 450, the billing system returns the expiration date of one year to the billing sector 220. Alternatively, as set forth above, a table may be established in the billing system 240 where specific PID data is mapped to duration periods as opposed to including duration periods in the PID. Accordingly, at step 445, the billing system may alternatively extract a duration period mapped to the PID to establish and expiration date.

At step 455, the billing sector 220 calls the core 235 and passes the data received from the billing system 240 to the licensing clearinghouse 250 of the provider of the desired web services. At step 460, the core 235 schedules and subsequently executes a communication with the licensing clearinghouse 250 via the clearinghouse sector 225. As described above with reference to the billing sector 220, a number of different licensing clearinghouse sectors 225 may be plugged into the LPS 210 for use with corresponding licensing clearinghouses of different services and/or product providers. At step 465, the core 235 passes to the licensing clearinghouse 250 the expiration date prepared by the billing system 240, the HWID, the AUID, and the PID via the clearinghouse sector 225.

At step 470, the licensing clearinghouse 250 utilizes the data received from the LPS 210 to prepare a license for use of the desired client applications and/or web services by the user at the client 20. The license prepared by the licensing clearinghouse 250 is transmitted to the LPS 210 via the clearinghouse sector 225. The clearinghouse sector 225 passes the licensing data to the core 235 that, in turn, schedules and executes a communication to the client 20 via the client services sector 215. At step 475, the client 20 receives the license from the client services sector 215, and the license is activated at the client 20. The user may now utilize the desired client applications and/or web services according to the license received from the license clearinghouse 250. The method ends at step 495.

If the expiration date of the user's license for the licensed services and/or product draws near the end, a license notice 300, as illustrated in FIG. 3, may be presented to the user via the graphical user interface 310 to notify the user that the license is set to expire. If the user desires to purchase additional time, the user may select the "purchase additional use" button 320, and the user may be prompted to provide a payment system such as a credit card number. The payment information from the user along with the HWID, PID, and AUID associated with the user's additional use request is then forwarded to the LPS 210 for processing, as described above with reference to FIG. 4, in order to add additional licensed use to the user's client computer 20.

According to an alternative embodiment, the user may contact the billing system 240 of the services product provider directly to purchase additional licensed use of the desired web services product. When the user receives the license notice 300, the user may select the "update license" button 330. Consequently, the identification information for the client computer 20 along with the PID and AUID may be forwarded to the billing system 240 via the LPS 210, as described above. The previously purchased extension to the license will be noted, and a new expiration date will be prepared by the billing system 240 to obtain an updated license from the clearinghouse 250.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for obtaining a computer services license, comprising:
    sending a services subscription license request to a client services sector of a license processing service (LPS), wherein sending the services subscription license request to a license processing service (LPS), comprises:
        sending a hardware identification for the client computer, wherein sending the hardware identification for the client computer comprises the hardware identification being provided by the client computer, and the hardware identification being calculated by a software program module operated on the client computer, and
        sending along with the services subscription license request a product identification number (PID) associated with the services subscription;
    sending the request from the client services sector to an LPS core component;
    scheduling, at the LPS core component, a transmission of the request to the billing system;
    formatting the request for consumption by a billing sector of the LPS;
    sending, via the billing sector of the LPS, the request from the LPS core component to a billing system associated with a provider of the services;
    at the billing system, determining an expiration date for the services subscription;
    sending the expiration date from the billing system to the LPS;
    sending the request and the expiration date from the LPS to a licensing clearinghouse associated with the provider of the services;
    at the licensing clearinghouse, granting a license for the services subscription;
    sending the license from the licensing clearinghouse to the LPS;
    scheduling, at the LPS core component, a transmission of the request to the licensing clearinghouse;
    scheduling, at the LPS core component, a transmission of the license to the client computer, wherein the transmission being scheduled to occur at a predetermined time;
    formatting the request and the expiration date for consumption by a clearing house sector of the LPS;
    sending the request and the expiration date to the licensing clearinghouse via the clearinghouse sector of the LPS; and
    sending the license from the LPS core component to the client computer.

2. The method of claim 1, further comprising:
    sending the expiration date from the billing system to the LPS via the billing sector of the LPS; and
    sending the expiration date from the billing sector to the LPS core component.

3. The method of claim 1, further comprising:
    receiving the license from the licensing clearinghouse at the clearinghouse sector of the LPS; and
    sending the license from the clearinghouse sector to the LPS core component.

4. The method of claim 1, prior to sending the request from a client services sector to an LPS core component, further comprising:

receiving the request at an authentication module;
authenticating a source of the request as a trusted source from which the request may be received: and
establishing an authentication user identification number (AUID) for the source.

5. The method of claim 4, whereby the step receiving the request at an authentication module includes receiving the request at an authentication module of the client services sector.

6. The method of claim 4, whereby the step receiving the request at an authentication module includes receiving the request at an authentication module of a remote authentication service.

7. The method of claim 1, whereby the step of sending the request to the billing system from the LPS core via a billing sector of the LPS includes:
sending the hardware identification (HWID) to the billing system;
sending the product identification number (PID) to the billing system; and
sending the (AUID) to the billing system.

8. The method of claim 1, whereby the step of sending the request and the expiration date to the licensing clearinghouse via a clearinghouse sector of the LPS includes sending the expiration date, the HWID, the PID, and the AUID to the licensing clearinghouse.

9. The method of claim 8, after the step of sending the license from the client services sector to the client computer, including:
receiving the license at the client computer; and
activating the license at the client computer.

10. The method of claim 1, further comprising:
establishing an extended expiration date at the billing system via a direct communication between a user of the license and the billing system;
upon expiration of the expiration date, notifying the user at the client computer to update the license;
sending a license update request to the LPS;
sending the update request from the LPS to the billing system;
at the billing system, finding the extended expiration date for the services subscription;
sending the extended expiration date from the billing system to the LPS;
sending the update request and the extended expiration date from the LPS to the licensing clearinghouse;
at the licensing clearinghouse, granting an updated license for the services subscription based on the extended expiration date;
sending the updated license from the licensing clearinghouse to the LPS; and
sending the updated license from the LPS to the client computer.

11. The method of claim 10, whereby the step of notifying the user at the client computer to update the license includes providing a graphical user interface via the client computer for notifying the user to update the license and for receiving input from the user.

12. The method of claim 1, whereby the services subscription includes use of a computer software application.

13. The method of claim 1, whereby the services subscription includes use of Internet-based web services.

14. A system for obtaining a computer services license, comprising:
a license processing service (LPS) comprising an LPS core component, a client services sector, a billing sector, and a clearinghouse sector, the LPS client services sector being operative to receive a services subscription license request from a client computer, wherein receiving the services subscription license request comprises receiving a hardware identification request for the client computer, the hardware identification for the client computer comprises the hardware identification being provided by the client computer, and the hardware identification being calculated by a software program module, the LPS core component being operative to communicate with the client computer via the client services sector and operative to send the request, via the billing sector, to a billing system associated with a provider of the services;
the billing system operative
to determine an expiration date for the services subscription and
to send the expiration date to the LPS;
the LPS core component being operative to send, via the clearinghouse sector, the request and the expiration date to a licensing clearinghouse associated with the provider of the services;
the licensing clearinghouse operative
to grant a license for the services subscription and
to send the license to the LPS; and
the LPS further operative to send the license to the client computer and
the LPS core component being further operative to
receive communications from each of the client services sector, the billing sector, and the clearinghouse sector,
schedule and transmit the license to the client computer, wherein the transmission being scheduled to occur at a predetermined time,
schedule communications from the LPS core component to each of the client services sector, the billing sector, and the clearinghouse sector, and
conduct communications from the LPS core component to each of the client services sector, the billing sector, and the clearinghouse sector.

15. The system of claim 14, whereby the LPS core component is further operative to format data for consumption by each of the client services sector, the billing sector, and the clearinghouse sector.

16. The system of claim 15, whereby the client services sector comprises an authentication module operative
to authenticate a source of the request as a trusted source from which the request may be received; and
to establish an authentication user identification number (AUID) for the source.

17. The system of claim 16, whereby the client services sector is further operative to communicate from the client computer to the LPS core component for transmission to the billing system via the billing sector a hardware identification (HWID) for the client computer, a product identification number (PID) associated with the services subscription, and the AUID.

18. The system of claim 17, whereby the LPS core component is further operative
to communicate the expiration date, the HWID, the PID, and the AUID to the licensing clearinghouse via the clearinghouse sector; and
to communicate the license from the licensing clearinghouse to the client computer via the clearinghouse sector and client services sector.

19. The system of claim 18, whereby the services subscription includes use of a computer software application.

20. The system of claim 18, whereby the services subscription includes use of Internet-based web services.

21. A computer readable medium having stored thereon computer-executable instructions which when executed by a computer, perform the method comprising:

receiving a services subscription license request at a license processing service (LPS) wherein receiving the services subscription license request at the license processing service comprises receiving the services subscription license request via a client services sector of the LPS;

sending the request from the client services sector to an LPS core component, wherein sending the request to the LPS core component, comprises:

sending along with the request a hardware identification for the client computer, wherein sending along with the request the hardware identification for the client computer comprises the hardware identification being provided by the client computer, and the hardware identification being calculated by a software program module operated on the client computer, and sending along with the request a product identification number (PID) associated with the services subscription;

scheduling a transmission of the request to the billing system at the LPS core component;

formatting the request for consumption a billing sector of the LPS; sending, via a billing sector of the LPS, the request from the LPS core component to a billing system associated with a provider of the services;

in response to the request, receiving an expiration date from the billing system at the LPS;

sending the request and the expiration date from the LPS to a licensing clearinghouse associated with the provider of the services;

receiving a license for the services subscription from the licensing clearinghouse to the LPS;

scheduling, at the LPS core component, a transmission of the license to a client computer, wherein the transmission being scheduled to occur at a predetermined time; and sending the license from the LPS core component to the client computer.

22. The computer readable medium of claim 21, further comprising:

sending the expiration date from the billing system to the LPS via the billing sector of the LPS; and sending the expiration date from the billing sector to the LPS core component.

23. The computer readable medium of claim 22, further comprising:

at the LPS core component, scheduling a transmission of the request to the licensing clearinghouse;

formatting the request and the expiration date for consumption by a clearing house sector of the LPS; and sending the request and the expiration date to the licensing clearinghouse via the clearinghouse sector of the LPS.

24. The computer readable medium of claim 23, further comprising:

receiving the license from the licensing clearinghouse at the clearinghouse sector of the LPS; and sending the license from the clearinghouse sector to the LPS core component.

25. The computer readable medium of claim 24, prior to sending the request from the client services sector to an LPS core component, further comprising:

receiving the request at the authentication module;

authenticating a source of the request as a trusted source from which the request may be received; and establishing an authentication user identification number (AUID) for the source.

26. The computer readable medium of claim 25, whereby the step receiving the request at an authentication module includes receiving the request at an authentication module of the client services sector.

27. The computer readable medium of claim 25, whereby the step receiving the request at an authentication module includes receiving the request at an authentication module of a remote authentication service.

28. The computer readable medium of claim 25, whereby the step of receiving a services subscription license request to a license processing service (LPS), further comprises:

receiving the request from a client computer;

receiving along with the request a hardware identification (HWID) for the client computer; and receiving along with the request a product identification number (PID) associated with the services subscription.

29. The computer readable medium of claim 28, whereby the step of sending the request to the billing system from the LPS core via a billing sector of the LPS includes:

sending the hardware identification (HWID) to the billing system;

sending the product identification number (PID) to the billing system; and sending the (AUID) to the billing system.

30. The computer readable medium of claim 29, whereby the step of sending the request and the expiration date to the licensing clearinghouse via a clearinghouse sector of the LPS includes sending the expiration date, the HWID, the PID, and the AUID to the licensing clearinghouse.

* * * * *

UNITED STATES PATENT AND TRADEMARK OFFICE
CERTIFICATE OF CORRECTION

PATENT NO. : 7,346,585 B1
APPLICATION NO. : 10/376742
DATED : March 18, 2008
INVENTOR(S) : Ferdinand Jay Alabraba et al.

Page 1 of 1

It is certified that error appears in the above-identified patent and that said Letters Patent is hereby corrected as shown below:

In column 11, line 3, in Claim 4, delete "received:" and insert --received;--, therefor.

Signed and Sealed this
Twenty-second Day of February, 2011

David J. Kappos
*Director of the United States Patent and Trademark Office*